Figure 1:
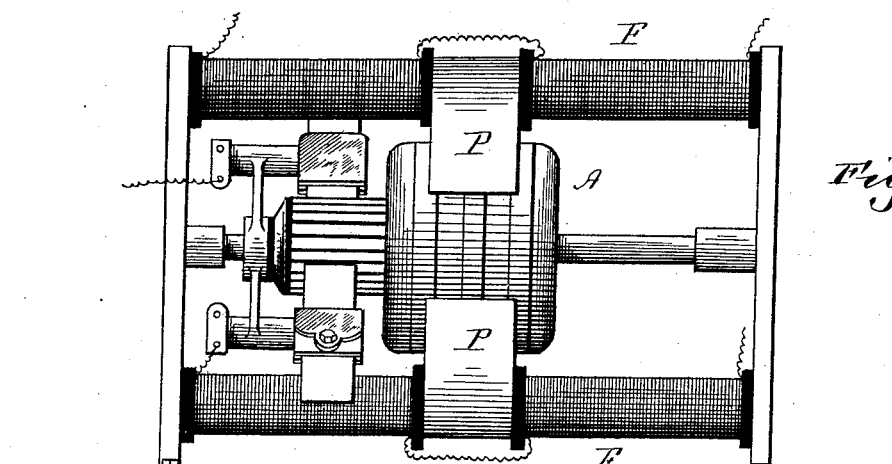

(No Model.)

H. W. SPANG.
DYNAMO ELECTRIC MACHINE.

No. 433,051. Patented July 29, 1890.

Witnesses:
J. B. McGinn.
N. C. Evert.

Henry W. Spang
Inventor.
by Connolly Bro
Atty's

UNITED STATES PATENT OFFICE.

HENRY W. SPANG, OF NEW YORK, N. Y.

DYNAMO-ELECTRIC MACHINE.

SPECIFICATION forming part of Letters Patent No. 433,051, dated July 29, 1890.

Application filed November 13, 1889. Serial No. 330,189. (No model.)

*To all whom it may concern:*

Be it known that I, HENRY W. SPANG, a citizen of the United States, residing at New York, in the county of New York and State of New York, have invented certain new and useful Improvements in Dynamo-Electric Machines or Generators; and I do hereby declare the following to be a full, clear, and exact description of the invention, reference being had to the accompanying drawings, which form part of this specification.

My invention has relation to dynamo-electric machines, and has for its object the provision of certain improvements bearing on the relation of the active inductive field to the armature or armatures, whereby that portion or the portions of the field which exhibit the greatest magnetic effect and from which the greater proportion of the lines of force proceed will be brought into close relation with the coils of the armature and utilized to the full extent of their inductive capacity.

It has been found by experience that in dynamo-electric machines of the most approved type the greatest magnetic influence exists at the end of the pole-pieces and the adjacent portions of the field-magnet bars—in other words, that at these points are gathered or concentrated and thence emanate the greatest proportions of the lines of force developed in the working of the machine. Inasmuch, therefore, as it follows that the greatest electrical development in a dynamo-electric machine results where the armature-core is entirely within the inductive influence of the field, and the lines of force are all intersected by the coils thereof, any departure from such construction or arrangement will necessarily produce a defective generator and result in a loss of or failure to utilize otherwise effective sources of current increase.

Dynamo-electric machines as heretofore constructed, and particularly those in which the armature is arranged to revolve between the curved pole-pieces of field-magnet bars or in juxtaposition to a single pole, the pole-pieces are so proportioned as to entirely span the armature in the direction of its length or axis; hence the attractive influence or magnetic property residing at the ends of the pole-pieces and the adjacent portions of the field-magnet bars are not fully utilized as active factors in the generation or increase inductively of the current strength or quantity.

My invention contemplates the utilization as far as practicable of every source of available magnetic energy obtainable from the field, and therefore consists, broadly, in a dynamo-electric machine or generator in which the armature-core will revolve in the field of highest magnetic energy and its coils intersect the line of force at their region of greatest concentration and inductive strength or inductive capacity.

Specifically my invention consists in a dynamo-electric machine of the type employing field-magnet bars with curved pole-pieces, in which the pole-pieces are proportionately less in length than the armature-core, so that the said armature-core will intersect all or most of the lines of force emanating from the ends of the pole-pieces and the adjacent portions of the field-bars.

Figure 2:
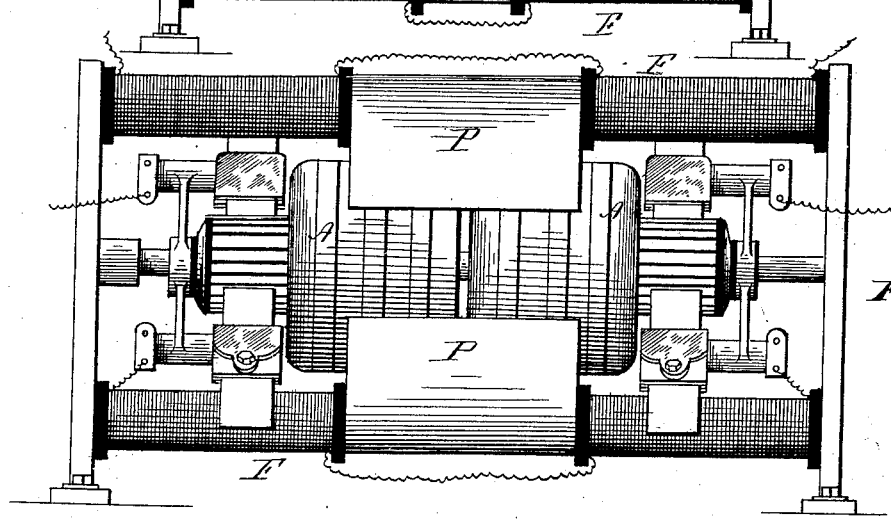
Figure 3:
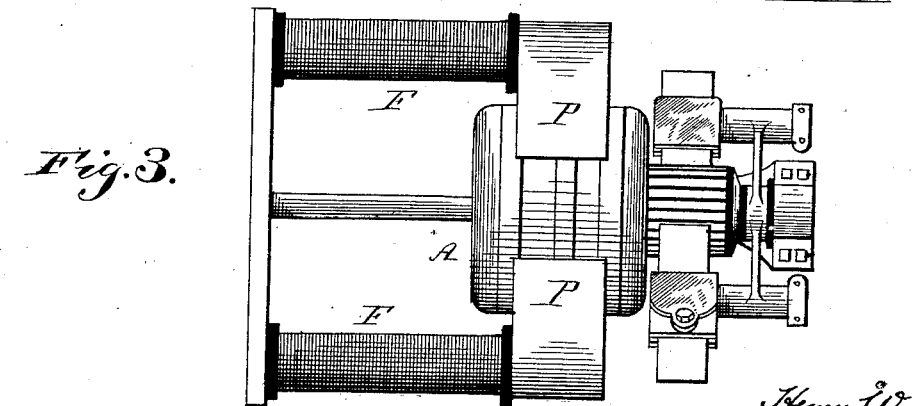
Figure 4:
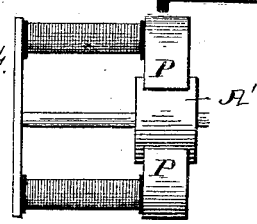

In the accompanying drawings, illustrating the practical application of my invention to different types of generators, Figure 1 is an elevation of a dynamo-electric machine of the Gramme or analogous type having a single armature arranged between opposite pole-pieces situated between the ends of the field-magnet bars. Fig. 2 is a similar view of a machine provided with two armatures. Fig. 3 is a similar view of a machine in which the pole-pieces are near the ends of the field-bars. Fig. 4 is a plan view of a naked dynamo-electric machine, showing the relation of the armature-ring and pole-pieces.

A designates the armature of a dynamo-electric generator constructed according to my invention and comprising the soft-iron ring or core A' and the coils A.

F F are the field-magnet bars, and P the pole-pieces.

In the form shown in Fig. 1 a single armature is employed, and the pole-pieces embracing the same are proportioned so as to cover in the direction of their length about two-thirds of the armature-core length, or even less, and in a properly-proportioned generator I find that under such conditions the inductively influencing or developed magnetism of the pole-pieces and of the portions of the field-bars adjacent thereto will be imposed on the receptive regions of the armature to such an extent that there will remain no practical or substantial waste or emanation of free magnetism, but that the magnetism of the field will be utilized to the fullest extent to which it is developed.

In the modified generator shown in Fig. 2 there are two armatures axially aligned. In this type of generator one-half the tension of the machine is raised in each armature, and each armature is consequently subjected to but one-half the electrical strain, and hence to but one-half the heating tendency, whereby the life of the armature is prolonged. For the purposes of my invention the two armatures may be treated as one single armature, and the pole-pieces of the field will be correspondingly of narrow proportions. The two armatures may be connected together in series or in multiple with one commutator, or each armature can be connected to a single commutator, and the two armatures, with their commutators, can be connected together in series or multiple with the field, or each armature, with its commutator, can be arranged in an independent field, or the field can be in one circuit and the armatures connected in series or multiple in another circuit and used for electrical generation or motor purposes.

Fig. 3 illustrates a modification, in which my invention is applied to what is known as a "single field-magnet," to distinguish it from the arrangement of which the forms shown in Figs. 1 and 2 are types, wherein the pole-pieces are located at medial points of the field-bars. In the arrangement shown in Fig. 3 the armature is prolonged, so as to be subject to the inductive influence of the innermost ends of the pole-pieces and the adjacent portions of the field-bars.

I am aware that it is not new to extend the wires forming the coils of an armature beyond the ends of the field pole-pieces; but such extension or projection has heretofore been the result of the coiling or superposing of the wires upon a core of the same or even less length than the pole-pieces; hence the core, which is an essential factor in the generation of the current, terminates inside those portions of the field from which emanate a large proportion of the lines of inductive force. Unless the extension of the armature-core is necessary, as well as the extension of the wire coils, it would appear that the core might be shortened indefinitely. Such a conclusion is obviously absurd, and it follows that the continuation or extension of the core itself into those portions of the field heretofore penetrated by the coils alone is essential for the utilization of the same.

Having described my invention, what I claim, and desire to secure by Letters Patent, is—

1. A dynamo-electric generator or motor having an armature arranged within and subject to the influence of two or more opposing pole-pieces of the same width, the core of said armature being extended so as to penetrate the field beyond each end of all the pole-pieces, substantially as described.

2. In a dynamo-electric generator or motor, the field of which comprises two or more parallel field-magnet bars wound exteriorly and supporting two or more opposing pole-pieces of the same width, the combination therewith of an armature having a magnetic core which extends beyond each end of all the pole-pieces and penetrates the field beyond the said ends of the pole-pieces, so as to be within the inductive influence of the lines of force proceeding from said pole-pieces and from the adjacent ends of the field-magnet bars, substantially as described.

In testimony that I claim the foregoing I have hereunto set my hand this 28th day of October, 1889.

HENRY W. SPANG.

Witnesses:
O. F. HIBBARD,
H. A. B. KELLY.